(12) United States Patent
Miyashita et al.

(10) Patent No.: US 6,985,288 B2
(45) Date of Patent: Jan. 10, 2006

(54) ILLUMINATION APPARATUS FOR MICROSCOPE AND MICROSCOPE

(75) Inventors: Tomohiro Miyashita, Kamakura (JP); Nobuhiro Shinada, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/443,078

(22) Filed: May 22, 2003

(65) Prior Publication Data

US 2003/0223108 A1    Dec. 4, 2003

(30) Foreign Application Priority Data

May 30, 2002  (JP)  ............................. 2002-157826

(51) Int. Cl.
*G02B 21/06*  (2006.01)

(52) U.S. Cl. .................................................... 359/385
(58) Field of Classification Search ................ 359/368, 359/385–390, 798, 799, 800
See application file for complete search history.

(56) References Cited

U.S. PATENT DOCUMENTS

| 4,397,529 A | * | 8/1983 | Taira ........................... 359/381 |
| 4,627,693 A | * | 12/1986 | Iba .............................. 359/376 |
| 4,851,882 A | * | 7/1989 | Takahashi et al. ............. 355/46 |
| 5,237,367 A | | 8/1993 | Kudo ........................... 355/67 |
| 5,760,963 A | * | 6/1998 | Mori ........................... 359/622 |
| 6,072,623 A | * | 6/2000 | Kitajima et al. ............. 359/368 |
| 6,507,434 B2 | | 1/2003 | Miyashita ..................... 359/387 |

* cited by examiner

*Primary Examiner*—Mark A. Robinson
*Assistant Examiner*—Alessandro Amari
(74) *Attorney, Agent, or Firm*—Miles & Stockbridge P.C (57) ABSTRACT

A microscopic illumination apparatus to be applied to a microscope selectively using plural types of objective lenses having different magnifications comprises a light source, a collector lens for making a light flux emitted from the light source a substantially parallel light flux, and at least two fly-eye lenses disposed side by side along the optical axis at the back of the collector lens. A space between the two fly-eye lenses is variable in accordance with an objective lens to be used in the microscope.

1 Claim, 9 Drawing Sheets

ONE ELEMENT OF THE FLY-EYE LENS

FIG. 11

ILLUMINATION APPARATUS FOR MICROSCOPE AND MICROSCOPE

This application claims the benefit of Japanese Patent application No. 2002-157826 which is hereby incorporated by reference.

BACKGROUND OF THE INVENTION

1. Field of the Invention

The present invention relates to a microscopic illumination apparatus which is applied to a microscope of a transmission type for bright field observation, and a microscopic apparatus with the microscopic illumination apparatus mounted thereon.

2. Related Background Art

On a microscope of the transmission type for bright field observation, there is mounted a microscopic illumination apparatus of a type of illuminating a sample from a position opposite to an objective lens with the sample being placed therebetween.

The primary performance required for such a microscopic illumination apparatus is a less unevenness in illumination (the uniformity of illumination) so that a Koehler illumination is employed.

A camera is often mounted on a microscope for recording a microscopic image. Recently, digital cameras are used because of an advanced performance of image pick-up elements such as a CCD. However, in an image obtained by a digital camera, even a slight difference in brightness is visualized so that a slight illumination unevenness in a Koehler illumination attracts attention.

For this reason, it is known that, in order to further improve the unevenness in illumination, an integrator such as a fly-eye lens or a rod that is employed in an illumination unit of a projection exposure apparatus is used, for a Koehler illumination.

Figure 9:
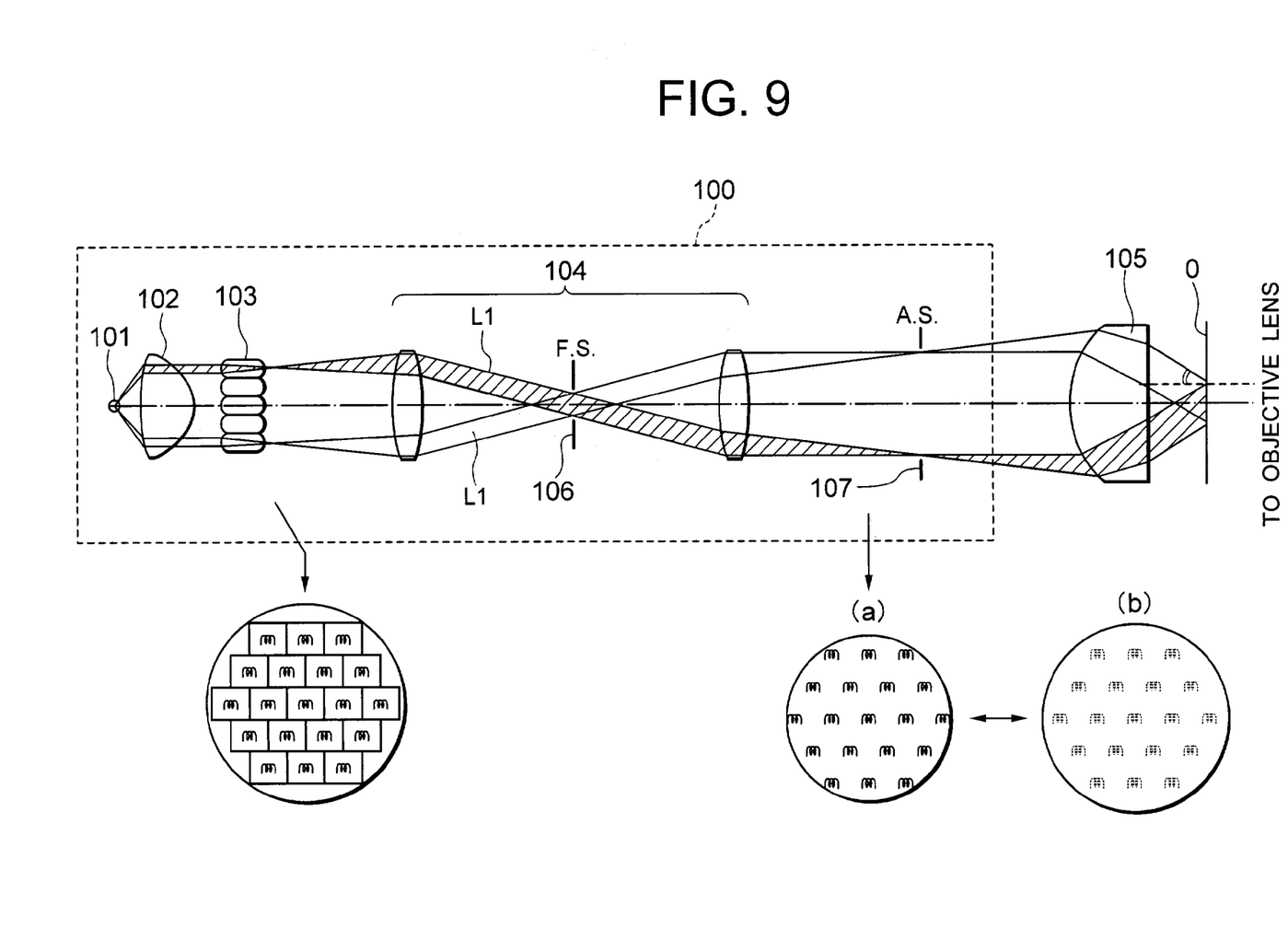
FIG. 9 is a view for showing the configuration of the microscopic illumination apparatus 100 in which a fly-eye lens is applied to a Koehler illumination.
Figure 10:
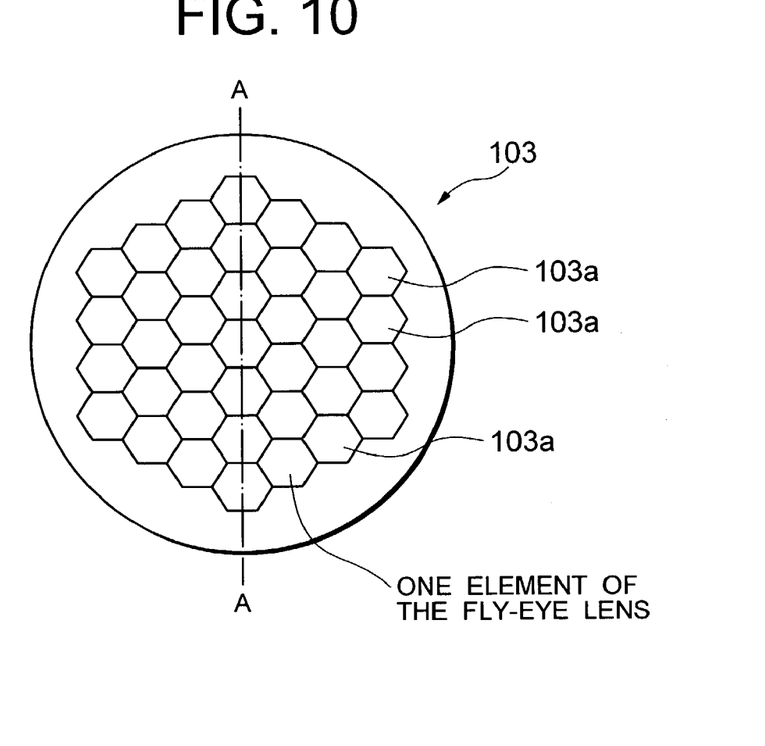
FIG. 10 is an enlarged front view of the fly-eye lens shown in FIG. 9.
Figure 11:
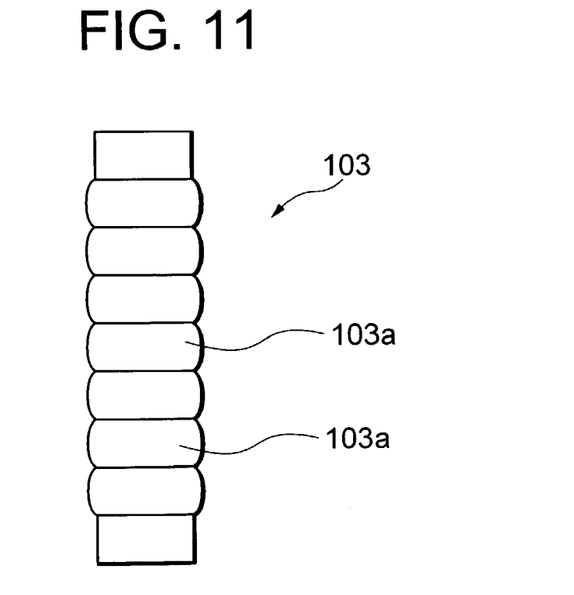
FIG. 11 is an A—A cross section of FIG. 10.

FIG. 9 is a configuration example of a microscopic illumination apparatus 100 in which a fly-eye lens (having a fly-eye structure both on the light source side and the condenser lens side) is applied to a Koehler illumination.

Note that, in FIG. 9, a reference symbol O denotes a sample surface of the microscope, and a reference numeral 105 a condenser lens attached to the microscope.

First, the microscopic illumination apparatus 100 is, as being of the Koehler illumination, provided with a light source 101 and a collector lens 102 for collimating the light flux emitted from the light source 101. Then, a fly-eye lens 103 is disposed near the rear focal plane of the collector lens 102.

The fly-eye lens 103 forms images of the light source 101 (light source image) near the exit plane of the respective lens elements thereof.

Note that, in this drawing, the light source image is schematically depicted in the form of a filament (which is the same in the other drawings). FIG. 9 shows a case where the light source image is relayed to near the front focal plane of the condenser lens 105 through a relay optical system 104.

In this case, light fluxes L1 and L2 which are passed through the lens elements disposed at the both ends of the fly-eye lens 103 are, after respectively forming the light source images on the exit side of the fly-eye lens 103 and in the vicinity of the front focal plane of the condenser lens 105, collimated and are incident on the same position on the sample surface O.

Incidentally, a microscope is generally constituted as being capable of various kinds of observation, so that an objective lens of the microscope is frequently replaced one having a different magnification if needed by the user.

Objective lenses having magnifications different from each other are, as having different properties from each other, different in terms of an illumination state for exhibiting the properties thereof.

Specifically, an objective lens having a high magnification (high magnification objective lens) demands of the microscopic illumination apparatus 100 an illumination having a small field of view and a high numerical aperture NA (for illuminating a small area with a light flux having a large maximum angle of incidence).

On the other hand, an objective lens having a low magnification (low magnification objective lens) demands of the microscopic illumination apparatus 100 an illumination having a large field of view and a low numerical aperture NA (for illuminating a large area with a light flux having a small maximum angle of incidence).

In addition, the condenser lens 105 is seldom replaced and the same condenser lens is used for various types of objective lenses of a comparatively wide magnification range from 4 times to 100 times.

Accordingly, in the microscopic illumination apparatus 100, an aperture stop 107 of the condenser lens 105 and a field stop 106 both of which are provided inside the apparatus are appropriately adjusted.

As seen from FIG. 9, the field stop 106 is adapted to restrict each of the light fluxes emitted from a plurality of light source images, thereby restricting the diameter of each of the light fluxes entering the sample surface O.

The aperture stop 107 is adapted to restrict the light fluxes emitted from a part of the plurality of light source images, thereby restricting the light fluxes having a large angle of incidence, out of the light fluxes entering the sample surface O.

In FIG. 9, a view (a) schematically shows light source images when the field stop 106 is open and the aperture stop 107 is stopped down, while a view (b) such light source images when the field stop 106 is stopped down and the aperture stop 107 is open, respectively.

In this case, in the conventional microscopic illumination apparatus 100 shown in FIG. 9, when an illumination state is set for the high magnification lens, the diameter of the aperture stop 107 is increased and the diameter of the field stop 106 is reduced. On the other hand, when the illumination state is set for the low magnification lens, the diameter of the aperture stop 107 is reduced and the diameter of the field stop 106 is increased.

More specifically, when the illumination state is set for the low magnification lens, the outer light source images out of the plurality of light source images are restricted by the aperture stop 107, as shown in (a) at the lower right of FIG. 9. When the illumination state is set for the high magnification lens, the brightness of the plurality of light source images is respectively restricted by the field stop 107, as shown in (b) at the lower right of FIG. 9 (in the views at the lower right of FIG. 9, the bright images are indicated by the solid lines, while the dark images are by the dotted lines).

The size of a light source image formed by each lens element of the fly-eye lens 103 is determined in accordance with a ratio of the focal length of the collector lens 102 and the focal length of each lens element of the fly-eye lens 103. If the focal length of the collector lens 102 is fixed, the size of the formed light source image is small when the focal length of each lens element of the fly-eye lens 103 is shortened, while the size of the formed light source image is large when the focal length of each lens element of the fly-eye lens 103 is elongated.

Generally, the brightness of a specimen at observation is determined in accordance with an areal ratio of the size of the light source image occupying the area of the pupil of the objective lens. Accordingly, a specimen can be observed with brighter illumination when a light source image formed by each lens element of the fly-eye lens is larger.

However, in the conventional illumination apparatus, as described above, the condenser lens is not replaceable. As a result, a range which can be illuminated becomes smaller when the light source image is larger.

Accordingly, in case of observation at a low magnification, it is necessary to limit the size of the light source image, in order to secure a sufficient size of the field of view. Thus, there arises a problem that the brightness of the illumination can not be increased more.

SUMMARY OF THE INVENTION

Accordingly, the present invention has for its object to provide a microscopic illumination apparatus of a transmission type which is capable of setting an optimal illumination state for each of various types of objective lenses having different magnifications, and a microscopic apparatus which is capable of making best use of the properties of the various types of the objective lenses having different magnifications, respectively.

According to the present invention, there is provided a microscopic illumination apparatus applied to a microscope selectively using plural types of objective lenses having different magnifications, which apparatus is characterized by comprising a light source, a collector lens for making a light flux emitted from said light source substantially a parallel light flux, and at least two fly-eye lenses disposed side by side along the optical axis in the vicinity of the rear focal plane of said collector lens with a space therebetween which is variable in accordance with an objective lens to be used in said microscope.

Preferably, the microscopic illumination apparatus according to the present invention may further comprise a relay optical system for relaying said plurality of images of the light source formed by said fly-eye lenses to the vicinity of the front focal plane of said condenser lens.

Preferably, in the microscopic illumination apparatus according to the present invention, said two fly-eye lenses include a first fly-eye lens having a surface with the fly-eye structure on the side of said light source and a second fly-eye lens having a surface with the fly-eye structure on the side of said condenser lens.

In the microscopic illumination apparatus according to the present invention, the contour of each lens element of said fly-eye lenses in cross section in the direction perpendicular to the optical axis is preferably a regular hexagon.

The microscopic apparatus according to the present invention may comprise an objective lens setting mechanism for supporting plural types of objective lenses having different magnifications and also for selectively inserting one of these objective lenses into an optical path for observation, and control means for the microscopic illumination apparatus for changing the focal length of said fly-eye lenses in said microscopic illumination apparatus in accordance with the type of the objective lens inserted in said optical path.

DETAILED DESCRIPTION OF THE PREFERRED EMBODIMENTS

An embodiment of the present invention in which a fly-eye lens is applied to a Koehler illumination in the same manner as shown in FIG. 9, will be described with reference to the drawings.

(First Embodiment)

A first embodiment of the present invention will be described with reference to FIGS. 1, 2 and 3.

Figure 1:
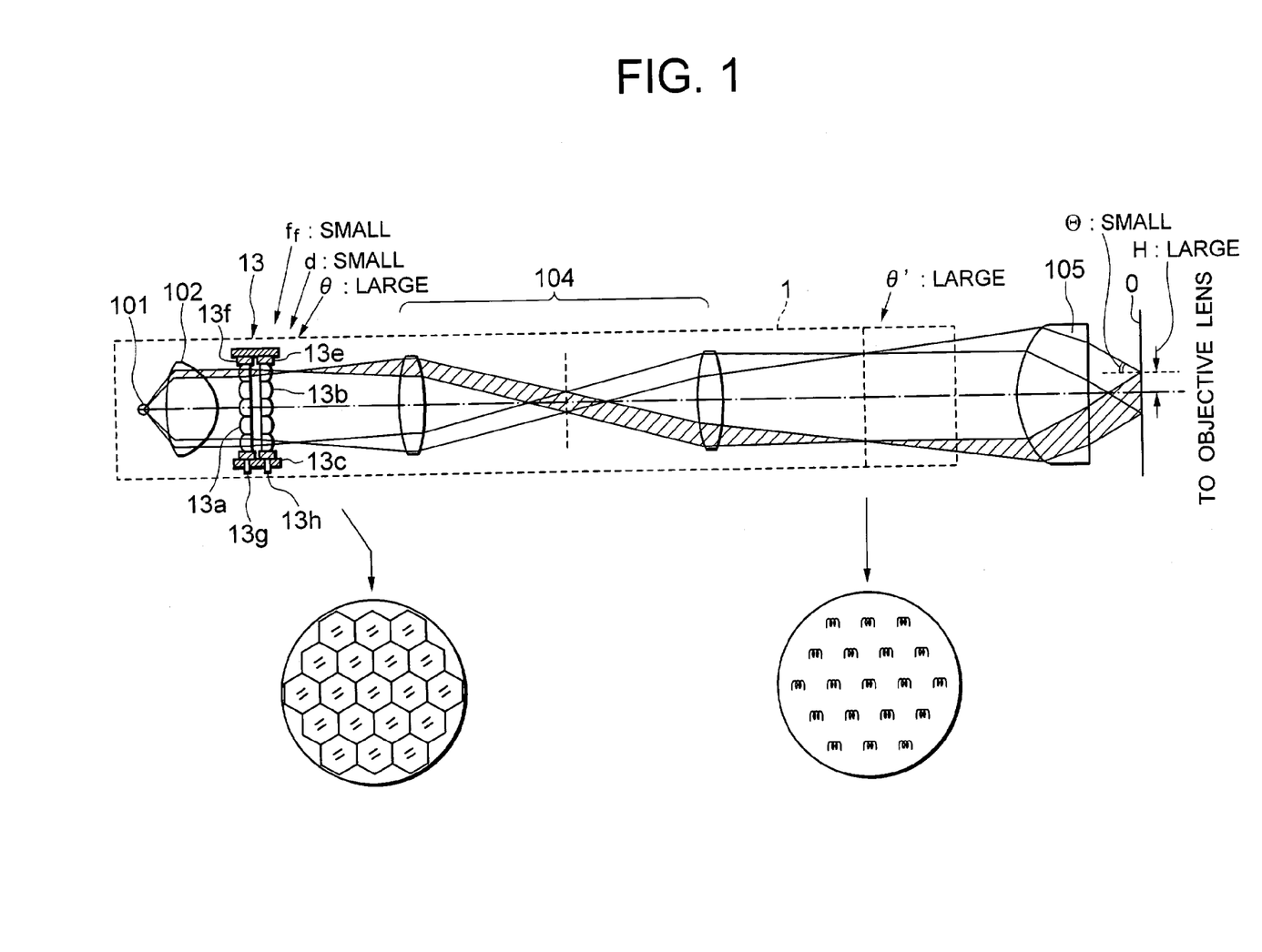
FIG. 1 is a view for illustrating the configuration of a microscopic illumination apparatus 1 according to a first embodiment of the present invention.

FIG. 1 is a view for illustrating the configuration of a microscopic illumination apparatus 1 of the present embodiment.

In FIG. 1, the same elements as those shown in FIG. 9 are given the same reference numerals, and only a difference from the microscopic illumination apparatus 100 shown in FIG. 9 will be described.

The microscopic illumination apparatus 1 of the present embodiment is different from the microscopic illumination apparatus 100 shown in FIG. 9 in that, instead of the fly-eye lens 103, there is provided a fly-eye lens 13 which includes a first fly-eye lens 13a having the fly-eye structure only on the light source side and a second fly-eye lens 13b having the fly-eye structure only on the condenser lens side.

Though not essential, it is preferable that a relay optical system 104 be provided for suppressing a change in the illumination state of a sample surface O which may be caused by a positional deviation of an optical element such as the fly-eye lens 13. Particularly, in the present embodiment, it is preferable that the relay optical system 104 be provided since the fly-eye lens 13 is driven (which will be fully described later).

It is also preferable that the aperture stop 107 and the field stop 106 be provided in order to prevent a stray light, as in the microscopic illumination apparatus 100. However, the microscopic illumination apparatus 1 of the present embodiment is not arranged to be actively driven to change an illumination state (including the size of the field of view or the maximum angle of incidence on the sample surface O), so that description will be omitted.

The fly-eye lens 13 is disposed in the vicinity of the rear focal plane of the collector lens 102, like the fly-eye lens 103. However, unlike the fly-eye lens 103, the focal length of the fly-eye lens 13 is variable.

Figure 2A:
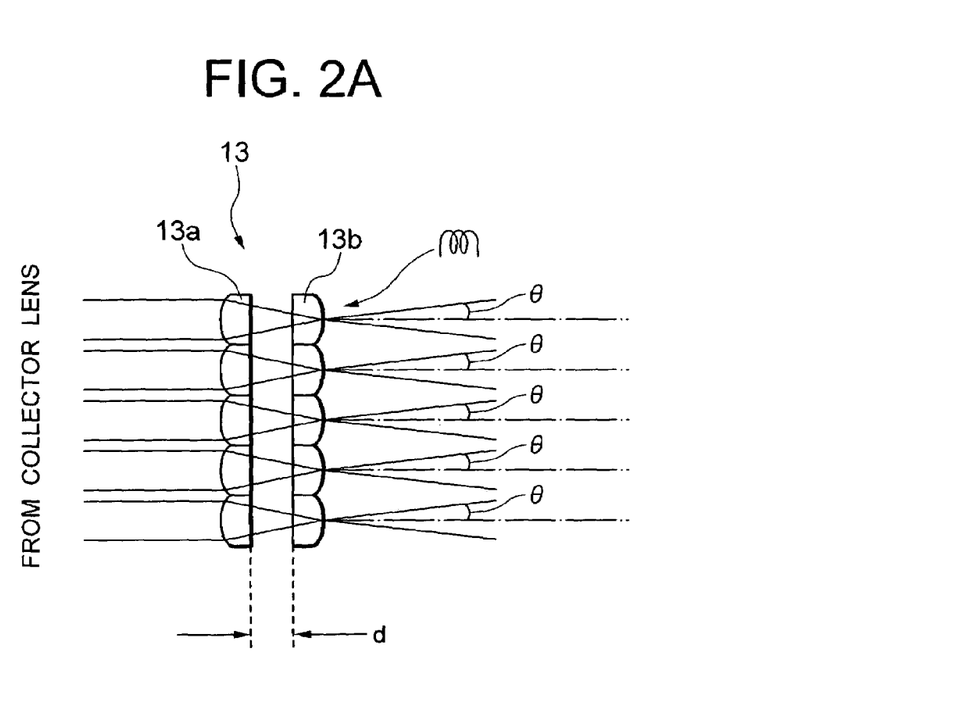
FIGS. 2A and 2B represent views for illustrating a fly-eye lens 13 according to the first embodiment.
Figure 2B:
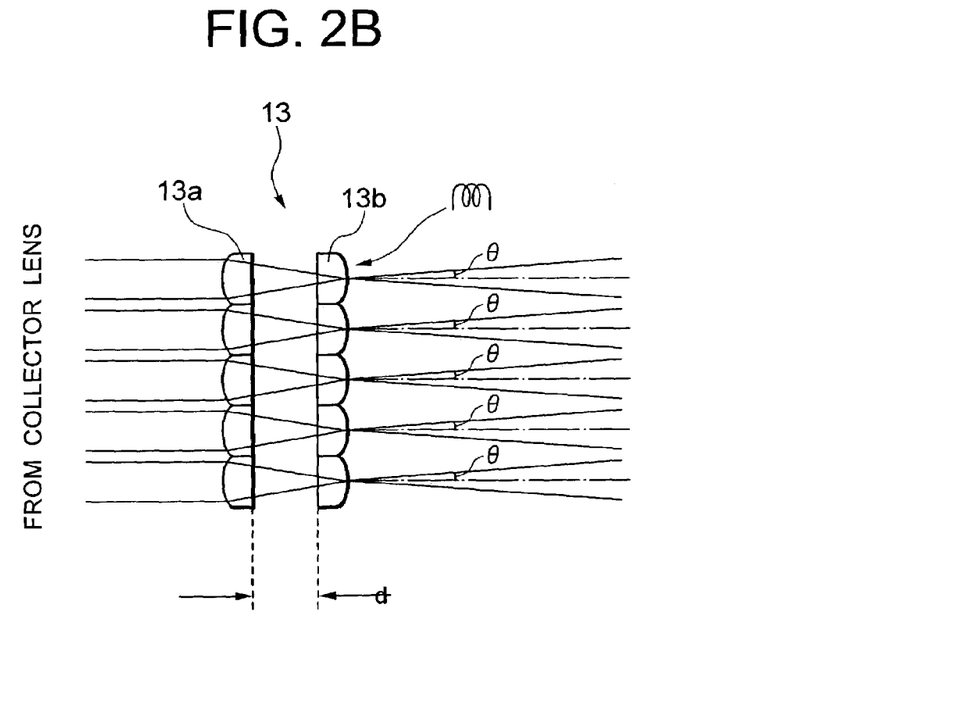

FIGS. 2A and 2B represent views for illuminating the fly-eye lenses 13 of the present embodiment.

As shown in FIGS. 2A and 2B, the fly-eye lens 13 includes the first fly-eye lens unit 13a and the second fly-eye lens unit 13b which are arranged from the side of the light source 101 in this order in such a manner that the optical surfaces of the both fly-eye lens units 13a and 13b are parallel to each other, in order to make the focal length thereof variable.

At least in an effective aperture range, a layout pattern of the lens elements of the first fly-eye lens unit 13a and that of the lens elements of the second fly-eye lens unit 13b correspond to each other. That is, a pair of lens elements composed of a lens element of the first fly-eye lens unit 13a and a lens element of the second fly-eye lens unit 13b constitute one lens component of the fly-eye lens 13.

This fly-eye lens 13 comprising a plurality of lens components (composed of a pair of lens elements) forms a plurality of light source images from a parallel light flux entering from the collector lens 102, like the lens elements of the fly-eye lens 103 shown in FIG. 9.

The focal length $f_f$ of the lens unit of the fly-eye lens 13 (composed of a pair of lens units) (i.e., the composite focal length of the paired unit lenses) is short when the distance d between the first fly-eye lens 13a and the second fly-eye lens 13b is short (FIG. 2A), and is long when the distance d is comparatively long (FIG. 2B).

In order to give the above-described properties to the fly-eye lens 13, it is suffice, for example, if each lens element of the first fly-eye lens unit 13a is formed as a plano-convex lens with the convex surface facing the light source 101 side and each lens element of the second fly-eye lens unit 13b as a plane-convex lens with the convex surface facing the sample O side. That is, each of the first fly-eye lens unit 13a and the second fly-eye lens unit 13b is arranged to have the fly-eye structure only on one surface thereof.

In this case, it is preferable that the form of the other surface in the vertical direction with respect to the optical axis be flat. Then, it is also preferable that this flat surface is disposed to be opposite.

It is not essential that the lens elements of the first fly-eye lens 13a correspond the respective lens elements of the second fly-eye lens unit 13b in radius of curvature. However, in order to simplify the configuration of the fly-eye lens 13, it is preferable to use identical lens elements for the first fly-eye lens unit 13a and the second fly-eye lens unit 13b.

The surface of the first fly-eye lens unit 13a on the side of the second fly-eye lens unit 13b and the surface of the second fly-eye lens unit 13b on the side of the first fly-eye lens unit 13a are not required to be flat. However, it is preferable that the both surfaces be flat for the purpose of simplifying the manufacturing process of the both fly-eye lenses.

Incidentally, as will be clearly seen if the light fluxes shown in FIG. 1 are traced from the light source 101 to the sample surface O, in the microscopic illumination apparatus 1, the contour of the field of view (that is, the contour of an illumination area on the sample surface O) is determined in accordance with the outer contour of each lens component of the fly-eye lens 13. As a result, it is more preferable that the contour of the lens component of the fly-eye lenses (that is, the lens elements of the first fly-eye lens unit 13a and the lens elements of the second fly-eye lens unit 13b) is more nearly circular.

On the other hand, in order to enhance the uniformity in illumination on the sample surface O, it is more preferable that the number of the lens element units disposed in the effective aperture range of the fly-eye lens 13 (the disposing density) be larger.

Accordingly, it is preferable that the outer of the lens element unit in the fly-eye lens 13 (that is, the contour of the lens elements of the first fly-eye lens unit 13a and the contour of the lens element of the second fly-eye lens unit 13b) be regular hexagonal, as shown at the lower left in FIG. 1. A regular hexagon is a form closest to a circle and allowing the highest disposing density of the lens elements therein.

It is needless to say that the actual number of the disposed lens elements is larger than that shown in the drawing.

In order to make the distance between the first fly-eye lens unit 13a and the second fly-eye lens unit 13b variable, a driving mechanism such as a cam mechanism or a rack and pinion mechanism is provided on the fly-eye lens 13, in the same manner as in the case where the distance of a general optical element is made variable.

In the fly-eye lens 13 shown in FIG. 1, a cam mechanism is provided on a holder 13f for supporting the first fly-eye lens unit 13a and on a holder 13e for supporting the second fly-eye lens unit 13b.

The cam mechanism includes, for example, a cylindrical member 13c on which cam grooves are formed and pins 13g and 13h which are respectively secured to the holders 13f and 13e and are restricted to move only along the optical axis by the cam grooves. The cam mechanism varies the distance between the first fly-eye lens unit 13a and the second fly-eye lens unit 13b in response to a rotation of the cylindrical member 13c.

A stage (Z stage) for moving one or both of the holders 13f and 13e along the optical axis may be employed as the driving mechanism which is provided for the fly-eye lens 13.

These cam mechanism and stage may be driven by a motor or may be driven manually by the user.

FIG. 2A shows a case where the distance d between the first fly-eye lens unit 13a and the second fly-eye lens unit 13b is set to be short, while FIG. 2B shows a case where the distance d is set to be long.

As clearly seen from comparison of the both cases, if the distance d is short, the focal length $f_f$ of the fly-eye lens 13 becomes short, while if the distance d is long, the focal length $f_f$ of the fly-eye lens 13 becomes long.

In other words, the focal length $f_f$ of the fly-eye lens 13 in the present embodiment is extended and/or shortened upon extension and/or shortening of the distance d.

Next, an operation of the fly-eye lens 13 of the present embodiment will be described by comparing a case of FIG. 1 and that of FIG. 3.

FIG. 1 shows a state of the microscopic illumination apparatus where the focal length $f_f$ of the fly-eye lens 13 is set to be short (see FIG. 2A; where the distance d is set to be short).

Figure 3:
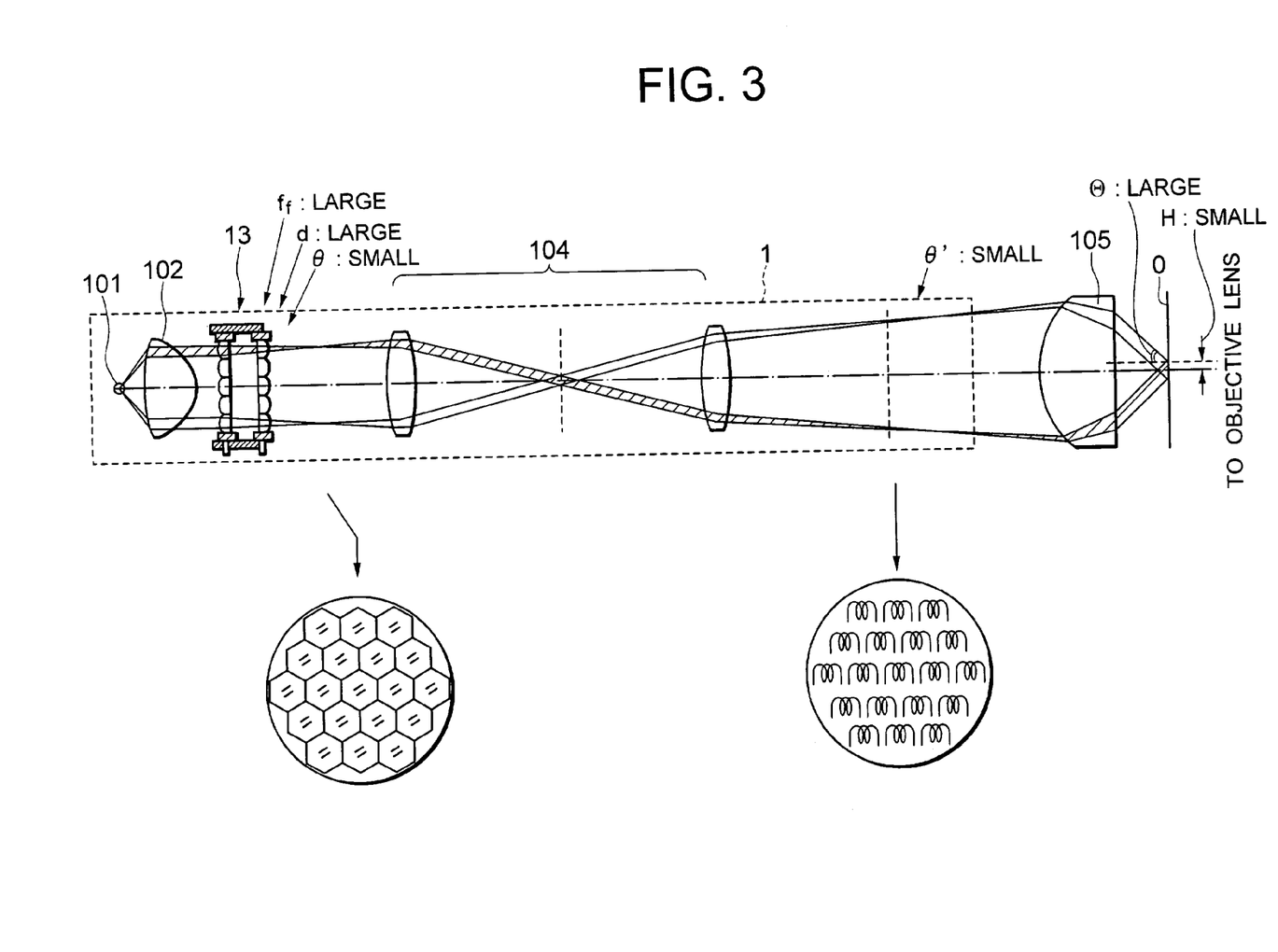
FIG. 3 is a view for showing a state of the microscopic illumination apparatus 1 when the focal length $f_f$ of the fly-eye lens 13 is set as long.
Figure 4:
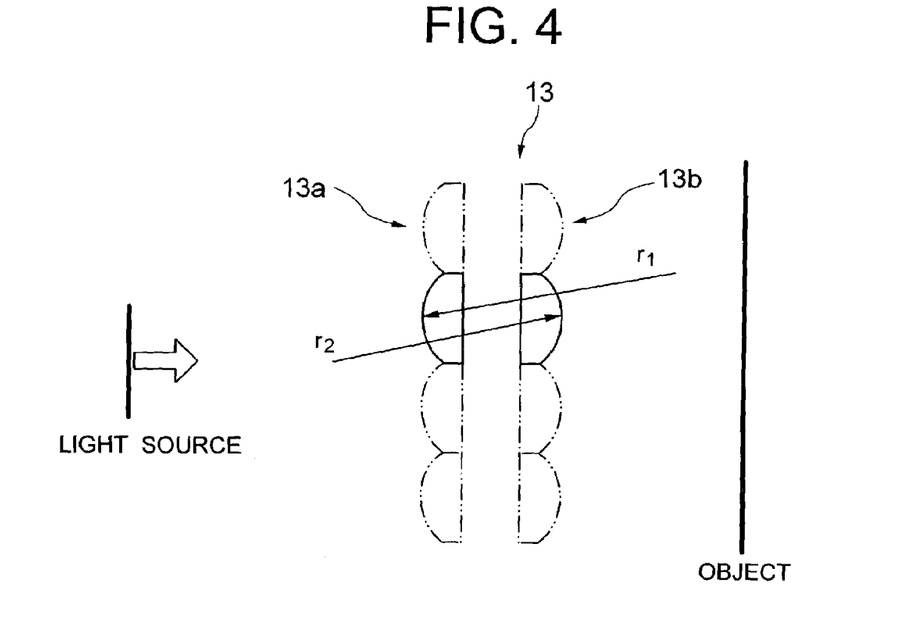
FIG. 4 is a schematic enlarged view showing the fly-eye lens 13 according to the first embodiment.
Figure 5:
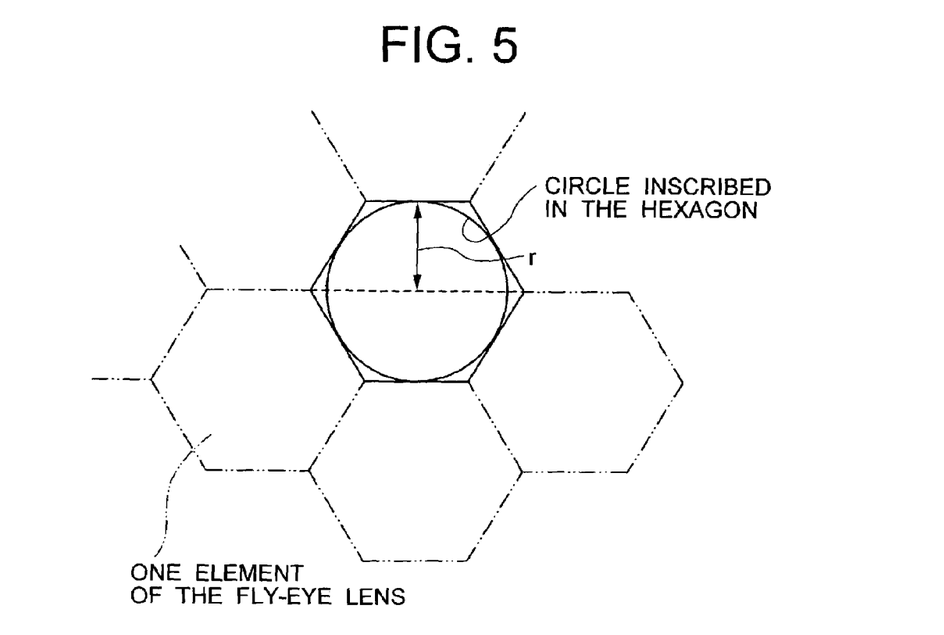
FIG. 5 is a schematic partially enlarged view explaining the structure of the fly-eye lens.

On the other hand, FIG. 3 shows a state of the microscopic illumination apparatus where the focal length $f_f$ of the fly-eye lens 13 is set to be long (see FIG. 2B; where the distance d is set to be long).

First, as shown in FIG. 1, if the focal length $f_f$ of the fly-eye lens 13 is short (see FIG. 2A), a light source image formed by each lens component turns to be small and the maximum exit angle θ of a light flux emitted from the light source image (and, resultantly, the maximum exit angle θ' of the light flux emitted from the light source image at the back of the relay optical system 104) becomes large.

In this case, the maximum entrance angle Θ of a light flux entering the sample surface O becomes small, and the diameter H of the illumination range on the sample surface O becomes large. That is, an illumination with a low numerical aperture and a large field of view can be implemented. This is an illumination state required by the low magnification lens.

On the other hand, as shown in FIG. 3, if the focal length $f_f$ of the fly-eye lens 13 is long (see FIG. 2B), a light source image formed by each lens component turns to be large and the maximum exit angle θ of a light flux emitted from the light source image (and, resultantly, the maximum exit angle θ' of the light flux emitted from the light source image at the back of the relay optical system 104) becomes small.

In this case, the maximum entrance angle Θ of a light flux entering the sample surface O becomes large, and the diameter H of the illumination range on the sample surface O becomes small. That is, an illumination with a high numerical aperture and a small field of view can be implemented. This is an illumination state required by the high magnification lens.

Accordingly, in the microscopic illumination apparatus 1 of the present embodiment, when the low magnification lens is used, it is suffice only if reducing the focal length $f_f$ of the fly-eye lens 13 by reducing the distance d while, when the high magnification lens is used, it is sufficient only if increasing the focal length $f_f$ of the fly-eye lens 13 by increasing the distance d.

When this microscopic illumination apparatus 1 is applied in a microscope, the user may move the distance d of the fly-eye lens 13 in the microscopic illumination apparatus 1 little by little by visually inspecting a microscopic image when an objective lens of the microscope is replaced with one having a different magnification, so as to maintain the distance at the timing at which the user is certain to obtain an excellent image.

Note that, if the cam mechanism or the stage are arranged such that the distance d is changed gradually, the above operation to be conducted by the user turns to be easy. The gradual change of the distance in this case includes various distances (d-4, d-10, d-20, d-30, d-60 and d-100) respectively optimal for various kinds of objective lenses (an objective lens of 4 times magnification, an objective lens of 10 times magnification, an objective lens of 20 times magnification, an objective lens of 30 times magnification, an objective lens of 60 times magnification and an objective lens of 100 times magnification).

In the microscopic illumination apparatus 1 of the present embodiment, if only the variable range of the focal $f_f$ of the fly-eye lens 13 is arranged to be sufficiently large, it is possible to securely obtain a sufficiently large variable range for the maximum entrance angle Θ of a light flux entering the sample surface O and variable range for the diameter H of the illumination range of the sample surface O.

As a result, it is possible to set the optimal illumination state for any low magnification lens or high magnification lens to be used.

In the microscopic illumination apparatus 1 of the present embodiment, if the illumination state is set either for the high magnification lens or the low magnification lens, a light is not limited, unlike in FIGS. 1 and 3, but only the diameter of a light flux is changed.

That is, when the illumination state is set for the low magnification lens, each of the plural light source images is contracted, as shown at the lower right in FIG. 1. On the other hand, when the illumination state is set for the high magnification lens, each of the plural light source images is expanded, as shown at the lower right in FIG. 3. However, in either case, a quantity of the light entering the sample O (and, as a result, the objective lens) is maintained, so that there arises no power loss of the light source 101.

Consequently, even when the light source 101 having the same power, and the collector lens 102, the relay optical system 104 and the condenser lens 105 having the same sizes are used, the illumination by the microscopic illumination apparatus in the present embodiment is brighter than that of the microscopic illumination apparatus 100 shown in FIG. 9. This effect is exhibited particularly conspicuously when the high magnification lens is employed.

Moreover, generally, a high resolving power is required for the high magnification lens. However, in this embodiment, when the high magnification lens is used, the plurality of light source images are respectively enlarged, as shown at the lower right in FIG. 3, whereby a filling rate of the light source images formed in the pupil of the objective lens can be raised. As a result, it is possible to observe, with the microscopic illumination apparatus of the present embodiment, a finer object with higher contrast than that with the microscopic illumination apparatus 100 shown in (b) of FIG. 9.

As described above, by the use of the microscopic illumination apparatus 1 of the present embodiment, the optimal illumination state can be set for each of the objective lenses of various types having different magnifications.

Next, numerical examples of the fly-eye lens to be adopted in the embodiment of the present invention will be described.

Table 1 shows values for the specifications of a first numerical example of the fly-eye lens units 13a and 13b of the fly-eye lens 13 which is provided in the present microscopic illumination apparatus. In the following specifications, r1 denotes the radius of curvature of a lens element of the fly-eye lens unit 13a on the light source side, r2 the radius of curvature of a lens element of the fly-eye lens unit 13b on the object side, d1 the sum of the thicknesses of the fly-eye lens units 13a and 13b along the optical axis, nd the refractive index with respect to the d line (λ=587.56 nm), ν d an Abbe's number, f the focal length, and r the radius of a circle inscribed in the hexagon. It is noted that the same reference symbols are used in all of the following numerical embodiments.

As the unit for the focal length, the radius of curvature, and other lengths, "mm" is generally used. However, the unit is not limited to this, since the same optical performance can be obtained if the optical systems are proportionally enlarged or reduced.

TABLE 1

| | |
|---|---|
| r1 = 4.18 | d1 = 12.2 |
| r2 = −4.18 | nd = 1.522160 |
| ν d = 58.8 | |
| | r = 1 |

Table 2 shows values for the specifications of a second numerical example of the fly-eye lens units 13a and 13b of the fly-eye lens 13 which is provided in the present microscopic illumination apparatus.

TABLE 2

| r1 = 8.27 | d1 = 24.2 |
|---|---|
| r2 = −8.27 | |
| nd = 1.51680 | |
| v d = 64.1 | |
| | r = 2 |

Table 3 shows values for the specifications of a third numerical example of the fly-eye lens units 13a and 13b of the fly-eye lens 13 which is provided in the present microscopic illumination apparatus.

TABLE 3

| r1 = 13.7 | d1 = 37.7 |
|---|---|
| r2 = −13.7 | |
| n d = 1.56883 | |
| v d = 56.1 | |
| | r = 3 |

(Second Embodiment)

A second embodiment of the present invention will be described with reference to FIG. 6.

Figure 6:
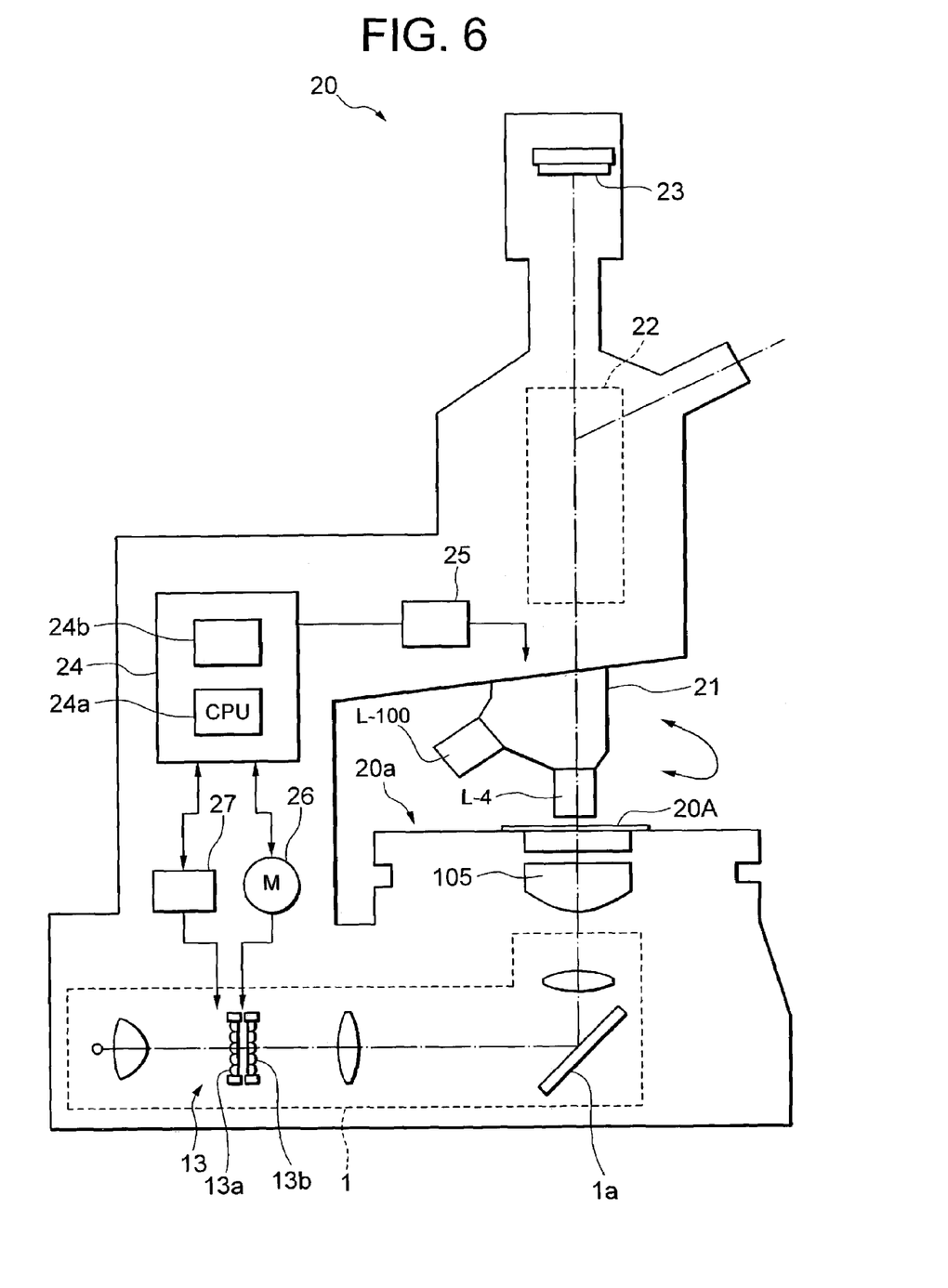
FIG. 6 is a view for showing the configuration of a microscopic apparatus according to a second embodiment of the present invention.

FIG. 6 is a view for showing the configuration of a microscopic apparatus according to the second embodiment of the present invention.

The microscopic apparatus 20 is of a transmission type used for bright field observation, which is adapted to form an enlarged image of a sample 20A of a transmission type with a light flux transmitted through the sample 20A. The enlarged image is detected by an image pick-up device 23.

The microscopic apparatus 20 is provided with a revolver 21 on which a plurality of objective lenses of different magnifications (including an objective lens L-4 of 4 times magnification and an objective lens L-100 of 100 times magnification) attached thereto. One of the plural objective lenses attached to the revolver 21 (the objective lens L-4 in FIG. 6) is disposed to face the sample 20A.

Note that an objective lens may be provided on a slider, instead of the revolver. In the present invention, a member for mounting an objective lens, such as a revolver or a slider is called an objective lens setting mechanism.

The objective lens facing the sample 20A (hereinafter called "the set objective lens"; the objective lens L-4 in FIG. 6) is adapted to form an enlarged image of a light flux from the sample 20A. Note that the enlarged image is formed not only by the set objective lens (the objective lens L-4 in FIG. 6), but also both by the objective lens and a predetermined observation optical system 22.

In the microscopic apparatus 20, the microscopic illumination apparatus 1 illuminates the sample 20A from a side opposite to the side of the set objective lens. Note that, in FIG. 6, the sample 20A is illuminated from below, but may be illuminated from above.

FIG. 6 shows the microscopic illumination apparatus 1 which is provided with a mirror 1a for bending an optical path by 90° in order to optimize a space for disposing the microscopic illumination apparatus 1 in the microscopic apparatus 20.

In the microscopic apparatus 20, a condenser lens 105 is provided in an optical path between the microscopic illumination apparatus 1 and the sample 20A.

In this case, the condenser lens 105 is designed to suit all of the objective lenses (including the objective lens L-4 of 4 times magnification and the objective lens L-100 of 100 times magnification) attached to the revolver 21.

The sample 20A is mounted on the stage 20a. The stage 20a is provided with a transmission part (aperture part) for transmitting an illumination light advancing from the condenser lens 105 toward the set objective lens.

Furthermore, the microscopic apparatus 20 of the present embodiment is provided with a control unit 24 (comprising a CPU 24a, a memory 24b, etc.), an address detecting unit 25, a distance detecting unit 27, a motor 26, etc.

The "address/magnification information" is stored in advance in the memory 24b in the control unit 24.

An address is allocated to each mount position at which an objective lens is mounted on the revolver 21 of the microscopic apparatus 20 which serves as an objective lens holding device. The user attaches a desired objective lens to each address of the revolver 21, and inputs the information on which address is to be given to which objective lens into the microscopic apparatus 20 through an unrepresented controller (having input keys, etc.) or the like. This information is "the address/magnification information".

The address detecting unit 25 is a sensor for recognizing a set address (which is the address of the mount position of the objective lens L-4 of 4 times magnification in FIG. 6).

The address detecting unit 25 is composed, for example, of a hole IC in combination with a magnet, or of a photo-interrupter in combination with a slit.

The CPU 24a inside the control unit 24 can recognize the magnification of the set objective lens by the use of the address/magnification information stored in the memory 24b and an output from the address detecting unit 25.

The motor 26 is coupled to a driving mechanism (a cam mechanism, a rack and pinion, a Z stage, or the like) of the fly-eye lens 13 inside the microscopic illumination apparatus 1, so as to change the distance d between two fly-eye lens units 13a and 13b of the fly-eye lens 13 (as shown in FIGS. 2A and 2B). The motor 26 is driven under the instructions of the CPU 24a.

The distance detecting unit 27 is adapted to detect the distance d of the fly-eye lens 13 inside the microscopic illumination apparatus 1, and is comprised of, for example, an encoder provided in the motor 26 in combination with a position sensor provided in the fly-eye lens 13.

When the accuracy required for the control of the distance d of the fly-eye lens 13 is high, it is preferable to use the Z stage as a driving mechanism of the fly-eye lens 13, a motor capable of control with high accuracy, such as a step motor, as the motor 26, and a sensor of an optical type as the distance detecting unit 27.

The CPU 24a inside the control unit 24 is adapted to control the distance d of the fly-eye lens 13 by driving the motor 26 with reference to an output from the distance detecting unit 27.

The "magnification/fly-eye distance information" is stored in advance in the memory 24b of the control unit 24, in addition to the address/magnification information.

For the objective lenses of various magnifications including, for example, an objective lens of 4 times magnification, an objective lens of 10 times magnification, an objective lens of 20 times magnification, an objective lens of 30 times magnification, an objective lens of 60 times magnification and an objective lens of 100 times magnification to be used, there are the optimal values to be set for the distance d of the fly-eye lens 13, including d-4, d-10, d-20, d-30, d-60 and d-100, each of which can be calculated beforehand.

The magnifications and the optimal values for the distance d for the respective magnifications are made correspondent to each other and are stored in the memory 24b. The information indicating the relation between these magnifications and the optimal values for the distance d is the "magnification/fly-eye distance information".

The magnification/fly-eye distance information can be obtained in advance by measurement using the microscopic illumination apparatus 1 and the condenser lens 105 or an arithmetic calculation using the designed values of the microscopic illumination apparatus 1 and the condenser lens 105.

The CPU 24a of the control unit 24 refers, when periodically recognizing the magnification of the set object lens from an output of the address detecting unit 25 and the address/magnification information stored in the memory 24b at the time of starting power supply or threreafter to the microscopic apparatus 20, to the magnification/fly-eye distance information stored in the memory 24b and recognizes the optimal value for the distance d corresponding to the magnification.

The CPU 24a drives the motor 26 while referring to an output from the distance detecting unit 27 and sets the distance d of the fly-eye lens 13 at the optimal value therefor.

With the operation described above, the distance d of the fly-eye lens 13 inside the microscopic illumination apparatus 1 can be maintained at the optimal value with respect to the set objective lens all the time.

The above processing is not required to be executed by the CPU 24a periodically, but may be executed only when the revolver 21 is driven.

In the present embodiment, the microscopic illumination apparatus 1 may be arranged to be replaceable with respect to the microscopic apparatus 20. In this case, the "magnification/fly-eye lens distance information" peculiar to the microscopic illumination apparatus 1 is preferably given to the microscopic illumination apparatus 1 as in the form of ROM, etc., so as to be readable by the control unit 24 of the microscopic apparatus 20.

When there is a possibility of replacement of the condenser lens 105, the microscopic apparatus 20 may be arranged such that the type of the condenser lens 105 is recognized in the same manner as setting of the distance d of the fly-eye lens 13 in accordance with the magnification of the set objective lens, and the distance d of the fly-eye lens 13 is set in accordance with the recognized type.

The microscopic apparatus 20 may be arranged such that the field stop 106 and the aperture stop 107 are provided inside the microscopic illumination apparatus 1, and these members are changed in accordance with the extension and/or reduction of the distance d of the fly-eye lens 13 so as to prevent a stray light.

The microscopic apparatus 20 of the present embodiment is provided with only one electrically driven point, i.e., the fly-eye lens 13. However, it is needless to say that other members such as the revolver 21 may be also electrically driven.

In the present embodiment, a part or the whole of the operation of the control unit 24 may be conducted by a controller or a computer which is provided independently of the microscopic apparatus 20.

An example of a distance adjusting device for changing the distance between the first fly eye lens unit 13a and the second fly eye lens unit 13b of the first fly eye lens 13 will be described next with reference to FIG. 7.

Figure 7:
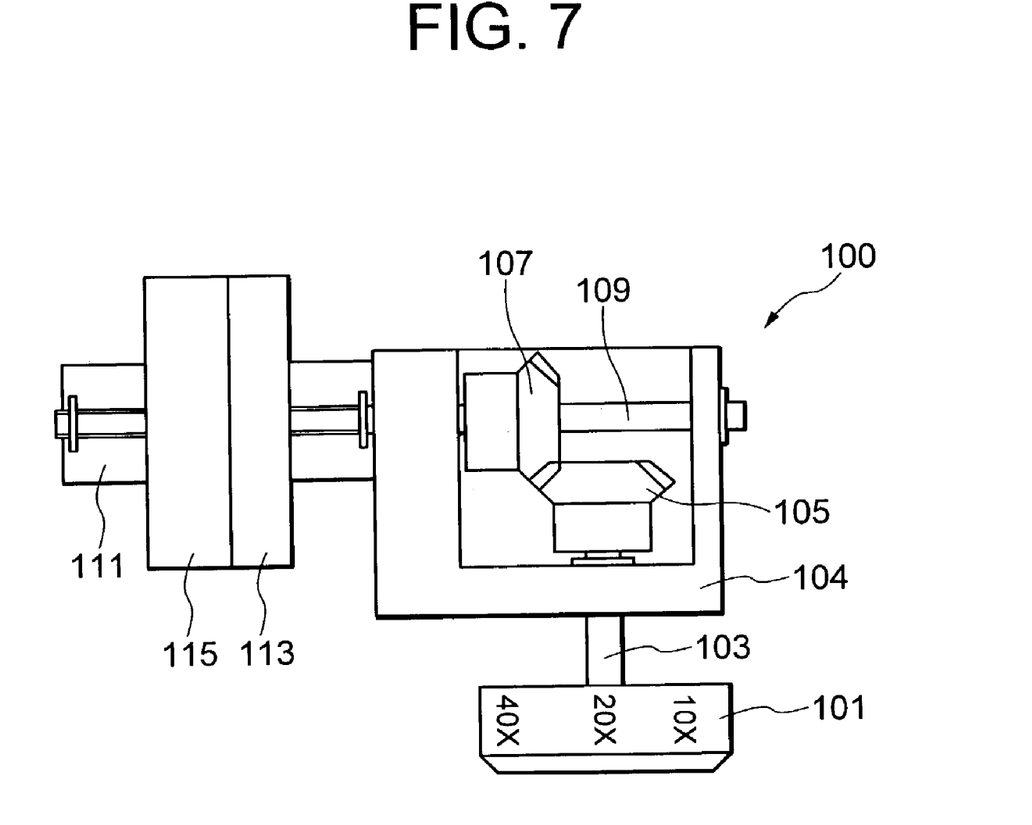
FIG. 7 is a schematic plan view of an example of a distance adjusting device to be employed in the embodiment of the present invention.

FIG. 7 is a schematic plan view of a manually operating type distance adjusting device 100, in which a knob 101 marked with magnifications such as 10×, 20× and 40×, is fixed a first shaft 103 which is rotatably supported on a base 104. A bevel gear 105 fixed to the first shaft 103, is engaged with a bevel gear 107 which is fixed to a second shaft 109. The second shaft 109 is rotatably supported on the base 110. A cam mechanism (not shown) is provided so as to convert the rotation of the second shaft 109 to a linear movement of a cylindrical member 113 supporting the second fly eye lens unit 13b provided along a guide rail 111 fixed to the base 104. A cylindrical member 115 supporting the first fly eye lens unit 13a is fixedly provided on the base 104.

For such a structure, the second fly eye lens unit 13b is moved along the rail 111 by manually operating the knob 101 to a desired magnification position.

Figure 8A:
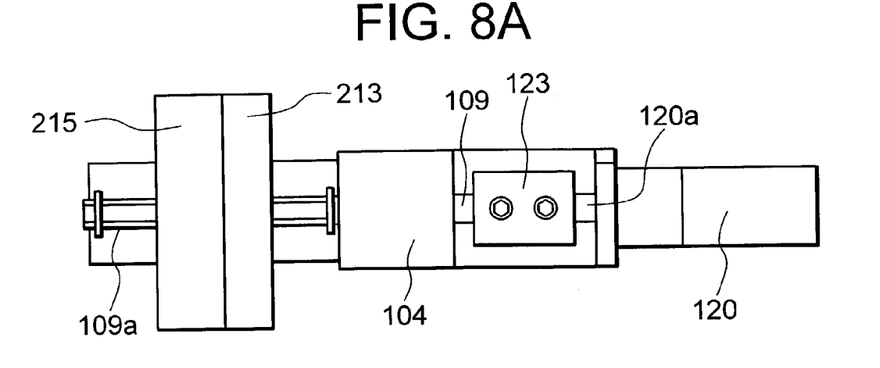
FIG. 8A is a schematic plan view of another example of the distance adjusting device to be employed in the present invention.
Figure 8B:
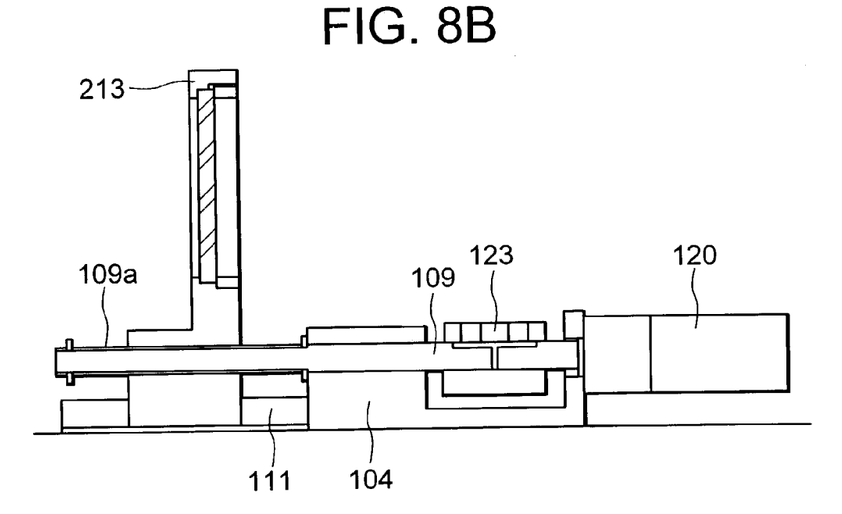
FIG. 8B is a longitudinal cross sectional view of FIG. 8A.
Figure 8C:
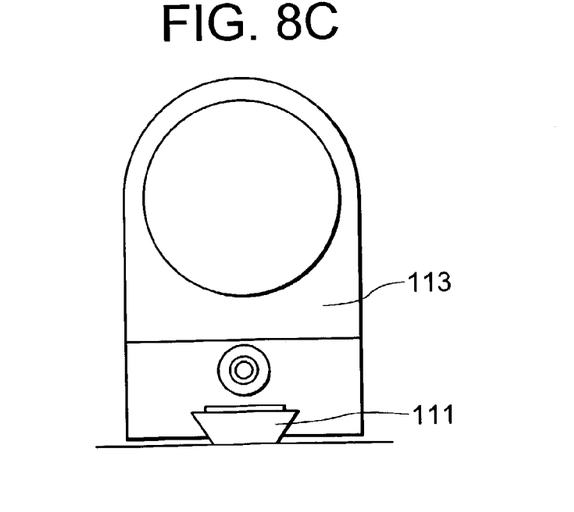
FIG. 8C is a right side view of FIG. 8B.

FIGS. 8A–8C show another example of the distance adjusting device, in which a motor 120 is provided instead of the manually operating knob 101, and a coupling 123 for connecting a motor shaft 120a to the second rotation shaft 109 is adopted instead of the bevel gear pair in the distance adjusting device shown in FIG. 7.

The second shaft 109 is formed with a lead screw 109a over a certain length thereof opposed to the rail 111. A cylindrical member 213 supporting the second fly eye lens unit 13b is provided along the rail 111 and operatively coupled with the lead screw 109a to be movable along the rail 111 by the rotation of the second shaft 109. A cylindrical member 215 supporting the first fly eye lens unit 13a is fixedly provided on the base 104. Other structure of the distance adjusting device shown in FIGS. 8A–8C is the same as shown in FIG. 7.

The distance between the first and second fly eye lens units 13a and 13b and a driving amount of the motor 120 have been predetermined. For example, a magnification setting switch (not shown) is provided so that, by manually setting the switch to a desired magnification, the motor may be driven by an amount by which the cylindrical member 113 supporting the second fly eye lens unit 13b is moved.

According to the present invention, it is possible to obtain a microscopic illumination apparatus of the transmission type for bright field observation, which is capable of setting the optimal illumination state for each of the various types of the objective lenses having different magnifications.

What is claimed is:

1. A microscopic illumination apparatus be applied to a microscope selectively using plural types of objective lenses having different magnifications, which apparatus comprises:
   a light source;
   a collector lens for making a light flux emitted from said light source a substantially parallel light flux; and
   at least two fly-eye lenses disposed side by side along the optical axis at the back of said collector lens, with a space therebetween which is variable in accordance with an objective lens to be used in said microscope;
   wherein distance between the two fly-eye lenses is variable in accordance with magnification of the objective lens to be used; and
   wherein when magnification of the objective lens is lower, focal length of a fly-eye lens set including said fly-eye lenses is made shorter, and when magnification of the objective lens is higher, focal length of a fly-eye lens set including said fly-eye lenses is made longer, in each case by changing a distance between two of said fly-eye lenses.

* * * * *